United States Patent
Friedman et al.

(10) Patent No.: US 12,517,343 B2
(45) Date of Patent: Jan. 6, 2026

(54) TUNABLE LENS WITH TRANSLATABLE REFLECTOR

(71) Applicant: Meta Platforms Technologies, LLC, Menlo Park, CA (US)

(72) Inventors: Brandon Michael Hellman Friedman, Redmond, WA (US); Babak Amirsolaimani, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 430 days.

(21) Appl. No.: 18/079,427

(22) Filed: Dec. 12, 2022

(65) Prior Publication Data

US 2024/0118535 A1    Apr. 11, 2024

Related U.S. Application Data

(60) Provisional application No. 63/414,260, filed on Oct. 7, 2022.

(51) Int. Cl.
| | |
|---|---|
| *G02B 26/00* | (2006.01) |
| *G02B 5/30* | (2006.01) |
| *G02B 26/08* | (2006.01) |
| *G02B 27/01* | (2006.01) |
| *G06F 1/16* | (2006.01) |
| *G02B 7/182* | (2021.01) |

(52) U.S. Cl.
CPC ....... *G02B 26/0816* (2013.01); *G02B 5/3066* (2013.01); *G02B 27/0172* (2013.01); *G06F 1/163* (2013.01); *G02B 7/182* (2013.01); *G02B 2027/0123* (2013.01); *G02B 2027/0178* (2013.01)

(58) Field of Classification Search
CPC .............. G02B 26/0816; G02B 5/3066; G02B 27/0172; G02B 7/182; G02B 2027/0123; G02B 2027/0178; G02B 26/0825; G02B 27/283; G06F 1/163; G02F 1/133536
USPC ..................................................... 359/485.01
See application file for complete search history.

(56) References Cited

U.S. PATENT DOCUMENTS

| | | | |
|---|---|---|---|
| 11,042,039 B1 | 6/2021 | Trail | |
| 2017/0358136 A1* | 12/2017 | Gollier | .................... G06F 3/013 |
| 2020/0073123 A1* | 3/2020 | Martinez | .............. G02B 27/288 |

FOREIGN PATENT DOCUMENTS

WO        2021106048 A1    6/2021

OTHER PUBLICATIONS

European Search Report for European Patent Application No. 23201963.8, dated Feb. 22, 2024, 6 pages.

* cited by examiner

*Primary Examiner* — Henry Duong
(74) *Attorney, Agent, or Firm* — Greenberg Traurig, LLP

(57) ABSTRACT

A tunable lens including a pair of reflectors is disclosed. At least one of the reflectors may be curved for contributing to the focusing or defocusing power of the lens. At least one of the reflectors is translatable for tuning the focusing/defocusing power. The reflectors may be configured in a pancake lens configuration where one of the reflectors is a 50/50 reflector and the other is a polarization selective reflector. Refractive elements may be disposed between the reflectors for providing more optical power to the lens, and/or for balancing optical aberrations.

20 Claims, 7 Drawing Sheets

TUNABLE LENS WITH TRANSLATABLE REFLECTOR

REFERENCE TO RELATED APPLICATION

This application claims priority to U.S. Provisional Patent Application No. 63/414,260 entitled "Tunable Lens with Translatable Reflector", filed on Oct. 7, 2022, and incorporated herein by reference in its entirety.

TECHNICAL FIELD

The present disclosure relates to optical devices, and in particular to tunable optical elements, and visual display devices using such tunable optical elements.

BACKGROUND

Visual displays are used to provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems are intended for individual users. Visual displays are viewed either directly, or by means of special glasses that may include optical shutters, as well as special varifocal lenses.

An artificial reality system generally includes a near-eye display (e.g., a headset or a pair of glasses) configured to present content to a user. A near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed onto surrounding environment. In some near-eye displays, each eye of the user views an image displayed on a miniature display panel. The image may be observed through an ocular lens.

Compact and efficient display systems are desired for head-mounted displays. Because a display of HMD or NED is usually worn on the head of a user, a large, bulky, unbalanced, and/or heavy display device would be cumbersome and may be uncomfortable for the user to wear. Compact display devices require compact and efficient light sources, shutters, display panels, ocular lenses, and so on. Ocular lenses with a short focal length and large numerical aperture used in NED applications may benefit from focal length tunability.

BRIEF DESCRIPTION OF THE DRAWINGS

Exemplary embodiments will now be described in conjunction with the drawings, in which.

DETAILED DESCRIPTION

Figure 1A:
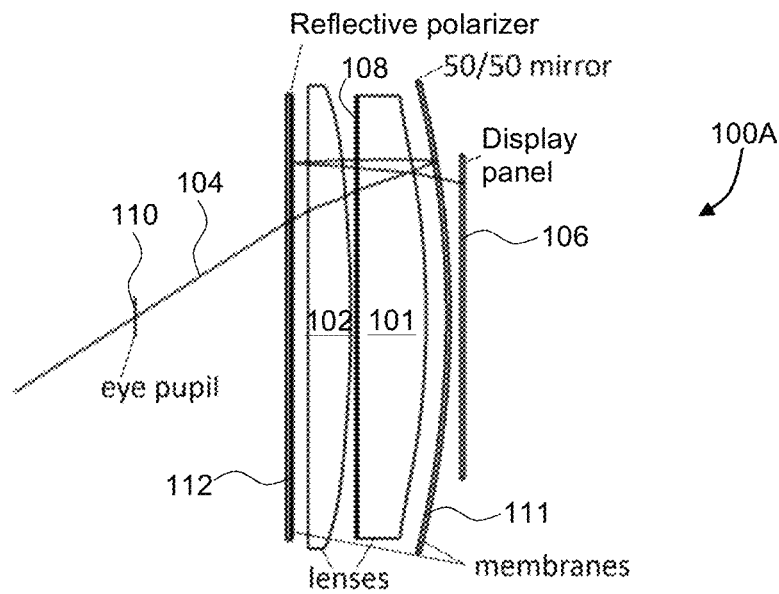
FIG. 1A is a side cross-sectional view of a tunable lens of this disclosure with at least one translatable reflector.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

Presenting simulated or augmented scenery to a user of a near-eye display can cause visual fatigue and nausea resulting from a limited capability of existing headsets to properly compensate for a discrepancy between eye vergence and eye focusing to accommodate a visual distance, a problem known as vergence-accommodation conflict. The vergence-accommodation conflict appears as a result of changing vergence of eyes of a user depending on what virtual object the user is looking at, while the accommodation (i.e. focusing) of the eyes is generally fixed and set by the distances between electronic display generating virtual images and a lens system projecting the images into user's eyes.

One solution to the problem of vergence-accommodation conflict in near-eye display systems based on miniature display panels viewed via ocular lenses is to move the display panels back and forth in accordance with the vergence angle of the objects displayed by the display panels. Physical movement of the display panels poses speed and reliability problems. Another solution is to make ocular lenses varifocal, like an eye lens itself, i.e. tune or change the optical power (i.e. the focusing or defocusing power) of the ocular lenses dynamically to accommodate the dynamic change in eye vergence.

A solution described herein provides an efficient and compact varifocal lens capable of quickly changing its optical power. A varifocal lens of this disclosure may be based on a so-called pancake lens including reflective optical elements in an optical path folded by polarization. A pancake lens may include two reflectors, e.g. one polarization-selective reflector and one partial reflector. By making at least one of these reflectors translatable, e.g. by using miniature actuator(s), the location of the reflector along the optical axis may be dynamically changed as needed. In addition to accommodation, a translatable reflector may be used to control a spherical correction and provide Rx correction instead of relying on prescription glasses.

In accordance with the present disclosure, there is provided a lens comprising opposed first and second reflectors. The first reflector is configured to at least partially transmit a light beam therethrough to impinge onto the second reflector. The second reflector is configured to at least partially reflect the light beam propagated through the first reflector back to the first reflector. The first reflector is further configured to at least partially reflect the light beam reflected by the second reflector back to the second reflector. The second reflector is further configured to at least partially transmit the light beam reflected by the first reflector. At least one of the first or second reflectors is translatable by application of a control signal for tuning at least one of a focal length of the lens or a location of a focal point of the lens. For example, the at least one of the first or second reflectors may be coupled to an actuator controllable by application of an external electric signal, for tuning the at least one of a focal length of the lens or a location of a focal point of the lens.

In some embodiments, the first reflector comprises a partially reflective mirror, e.g. a 50/50 mirror that reflects as much light as it transmits. The second reflector may include a reflective polarizer. The lens may further include a quarter-wave plate between the first and second reflectors for converting a polarization state of the light beam from a first polarization state to a second, orthogonal polarization state upon a double pass propagation of the light beam through the quarter-wave plate. The reflective polarizer may be e.g. a linear reflective polarizer. The actuator may include at least one of: a stepper motor, a voice coil actuator, a shape memory alloy, a DC motor, a piezo electric, or an electromagnetic actuator. The at least one of the first or second reflectors may be mounted on a translation stage movable by the actuator. At least one of the first or second reflectors may be deformable by application of a control signal for tuning the at least one of a focal length of the lens or a location of a focal point of the lens. The lens may further include refractive lens element(s) between the first and second reflectors.

In accordance with the present disclosure, there is further provided a pancake lens comprising a partial reflector, a linear reflective polarizer, and a quarter-wave plate in an optical path between the partial reflector and a linear reflective polarizer. At least one of the partial reflector or linear reflective polarizer is curved, and at least one of the partial reflector or linear reflective polarizer is at least one of translatable or deformable by application of a control signal for at least one of a focal length of the pancake lens or a location of a focal point of the pancake lens. The at least one of the partial reflector or the linear reflective polarizer may be coupled to actuator(s) controllable by application of an external electric signal, for tuning the at least one of a focal length or a location of a focal point of the pancake lens. The actuator(s) may include e.g. a stepper motor, a voice coil actuator, a shape memory alloy, a DC motor, a piezo electric, and/or an electromagnetic actuator. The at least one of the partial reflector or the linear reflective polarizer may be mounted on a translation stage movable by the actuator.

In accordance with the present disclosure, there is provided a near-eye display (NED) comprising a display panel for providing image light carrying an image, and a lens of this disclosure for viewing the image through the lens.

Referring now to FIG. 1A, a lens 100A of this disclosure includes opposed first 111 and second 112 reflectors with optional first 101 and second 102 refractive lens elements disposed in series between the first 111 and second 112 reflectors. The first 111 and second 112 reflectors may be deposited on/supported by the first 101 and second 102 refractive lens elements, or may be disposed on separate substrates. The lens 100A may function as a tunable ocular lens for viewing an image in linear domain displayed by a miniature display panel 106 at a short distance, by converting the image in linear domain into an image in angular domain at an eye pupil 110. Herein and throughout the rest of the specification, the term "image in linear domain" denotes an image where individual pixels of the image are represented by pixel linear coordinates, i.e. row and column numbers of the display panel, and the term "image in angular domain" refers to an image where individual pixels of the image are represented by an angle of a collimated optical beam at the eye pupil 110. In other words, the term "image in linear domain" denotes an image where individual pixels of the image are represented by ray coordinates, and the term "image in angular domain" refers to an image where individual pixels of the image are represented by ray angles. It is further noted that the image in angular domain may be viewed by an eye directly, because the eye's cornea and lens convert ray angles into ray coordinates on the eye's retina.

In operation, the display panel 106 emits image light carrying the displayed image. The image light is represented in FIG. 1A by a light beam 104. The first reflector 111 of the lens 100A is configured to at least partially transmit the light beam 104 through the first reflector 111 to impinge onto the second reflector 112. The second reflector 112 is configured to at least partially reflect the light beam 104 propagated through the first reflector 111 back to the first reflector 111. The first reflector 111 is further configured to at least partially reflect the light beam 104 reflected by the second reflector 112 back to the second reflector 112. The second reflector 112 is further configured to at least partially transmit the light beam 104 reflected by the first reflector 111, to the eye pupil 110.

The lens 100A has optical power due to presence of elements having optical power. For instance, the first reflector 111 may be curved as shown in FIG. 1A. The optional first 101 and second 102 refractive lens elements in an optical path between the first 111 and second 112 reflectors may also provide optical power for the lens 100A and/or balance optical aberrations. The curvature of individual optical elements may be selected so as to offset or reduce overall optical aberrations of the lens 100A. At least one or both of the first 111 or second 112 reflectors may be translatable and/or deformable by application of control signal(s) in form of an electrical signal, mechanical pressure or force, etc., for tuning the lens 100A, i.e. changing a location of a focal point of the lens 100A, a focal length of the lens 100A, and/or a location of an image plane provided by the lens 100A, relative to the eye pupil 110. The lens 100A focal point location is tuned in a controllable and predictable manner.

In some embodiments, the deformable reflectors 111 and/or 112 may change their radius of curvature, thereby changing their optical power and tuning the overall optical power of the lens 100A. The tunable optical power allows one to tune the axial location of the image plane of an image projected by the lens 100A. The reflectors 111 and/or 112 may be deformable by applying radial pressure to the reflectors 111 and/or 112. Both the position along the optical axis and the radius of curvature of the reflectors 111 and/or 112 may be varied in some embodiments. Furthermore, depending on specifics of configuration, a controllable compensation of eye aberrations, i.e. prescription of the eye, may be implemented.

Specific exemplary configurations of the first 111 and second 112 reflectors will now be considered. It is to be understood that the examples considered below are non-exclusive, and many other configurations are possible. The first reflector 111 may be a partially reflective mirror such as, for example, a 50/50 mirror which reflects the same amount of light as it transmits; that is, the optical energy per unit time of the transmitted and reflected light is the same. The second reflector 112 may be a reflective polarizer, e.g. a linear reflective polarizer configured to reflect linearly polarized light of a pre-defined orientation of the linear polarization. The lens 100A may further include a quarter-wave plate (QWP) 108 disposed between the first 111 and second 112 reflectors for converting a polarization state of the light beam 104 from a first polarization state to a second, orthogonal polarization state upon a double pass propagation of the light beam through the QWP 108 afforded by a reflection of the light beam 104 from the first reflector 111.

In FIG. 1A, the QWP 108 is shown laminated onto the first refractive lens element 101 as a non-limiting example. Other locations of the QWP 108 in an optical path between the first 111 and second 112 reflectors are possible, e.g. the QWP 108 may be laminated, or supported by, the second refractive lens element 102. The QWP 108 may also be laminated, or supported by, the first 111 or second 112 reflector, as long as the QWP 108 is disposed between the reflective surfaces of the first 111 and second 112 reflectors.

Figure 1B:
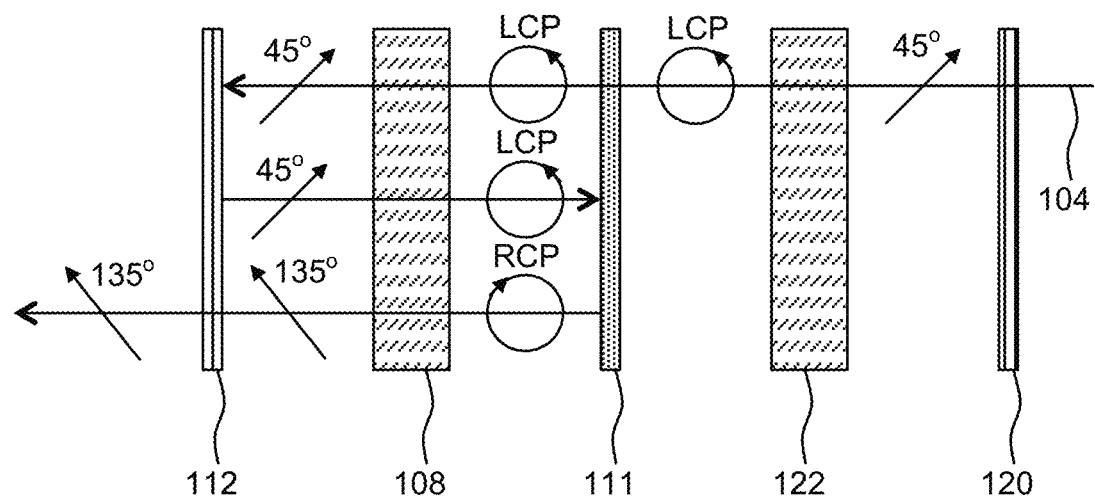
FIG. 1B is a polarization diagram of the tunable lens of FIG. 1A showing elements of the tunable lens of FIG. 1A in an exploded side view.

FIG. 1B provides an illustration of folding the optical path of the light beam 104 using a combination of a reflective polarizer, a polarization rotator such as a QWP used in double pass with an intermediate reflection, and a partial reflector. The display panel 106 may include a linear transmission polarizer 120 coupled to a display-side QWP 122, to make the light beam 104 circularly polarized. In this example configuration, the light beam 104 emitted by the display panel 106 is left-circular polarized (LCP) upon propagating through the display-side QWP 122.

The LCP light beam 104 propagates through the first reflector 111, i.e. the 50/50 reflector in this embodiment, and impinges onto the QWP 108, which converts the polarization state to a linear polarized state at 45 degrees. The second reflector 112, i.e. the linear reflective polairer in this embodiment, is configured to reflect the 45 degrees linearly polarized light, so the light beam 104 is reflected from the second reflector 112 to propagate back through the QWP 108, which converts the polarization state back to LCP. Upon reflection from the first reflector 111, the LCP light beam 104 becomes right circular polarized (RCP) because the direction of propatation of the light beam 104 changes. The RCP light beam 104 propagates through the QWP 108, becomes linearly polarized at 135 degrees, and is transmitted by the reflective polarizer to the eye pupil 110. It is to be noted that the polarization states and angles of linear polarization are only meant as an example, and other configurations for folding a light beam path by polarization are possible.

The lens 100A is an embodiment of a pancake lens usable as an ocular lens of a near-eye display. The polarization beam folding of the pancake lens' optical path enables the NED to be very compact, which may be highly desirable in NED applications. Such pancake lens includes a partial reflector (the first reflector 111); a linear reflective polarizer (the second reflector 112); and a quarter-wave plate (the QWP 108) in an optical path between the partial reflector and a linear reflective polarizer. At least one of the partial reflector or linear reflective polarizer may be curved to provide optical power for the pancake lens. At least one of the partial reflector or linear reflective polarizer may be translated by application of a control signal for tuning an axial location of a focal point and/or focal length and/or an image plane of the pancake lens. In a near-eye display application of the lens 100A, changing the image plane position relative to the eye pupil 110 position allows one to accommodate eye refocusing due to dynamically changing eye vergence, with the purpose of alleviating vergence-accommodation conflict.

It is to be noted that the shift of the focal point/image plane of the pancake lens may be achieved substantially without tuning optical power of the lens. If, for example, an element having optical power is not a reflector, such as a refractive lens, actuating either reflector (e.g. a flat reflector) can still shift the location of the image plane provided by the lens 100A without changing the effective focal length of the lens 100A. Similarly, if there is only a single element with optical power, for instance only one reflector is curved and no additional refractive elements are present, actuation of that reflector can change the focal spot/image plane location of the lens without changing the effective focal length of the lens.

Curving either reflector 111 and/or 112 may provide the smallest form factor, but it is not necessary if another refractive element is present in the lens 100A, e.g. the first 101 and/or second 102 refractive lens elements. Optical power of the lens 100A varies when (1) distance changes between elements of optical power, or (2) surfaces deform for changes in curvature. Focusing or defocusing to shift eye accommodation focus can occur without optical power variation if the focal point of lens is shifted with respect to a display panel being imaged. The location of the focal point is defined by lens parameters and optical path length, considering folded path of the lens 100A.

Figure 1C:
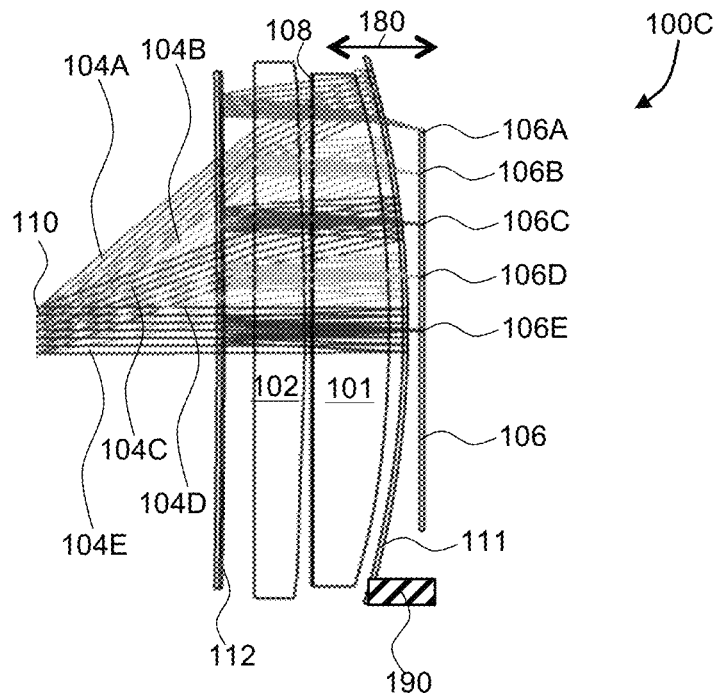
FIG. 1C is a ray-traced view of an embodiment of the tunable lens of FIG. 1A with a translatable partial reflector.

FIG. 1C illustrates an embodiment 100C of the tunable lens 100A of FIG. 1A having a curved translatable first reflector 111 (i.e. the partial reflector in this example). A coordinate of pixels 106A to 106E of the display panel 106 is converted into an angle of incidence of image light beams 104A to 104E emitted by the corresponding pixels 106A to 106E onto the viewer's eye pupil 110, converting an image in linear domain displayed by the display panel 106 into an image in angular domain at the viewer's eye pupil 110, with the conversion coefficient being defined by optical power of the tunable lens 100C. By translating the first reflector 111 along the optical axis of the lens 100, as illustrated with an arrow 180, the location of the image plane relative to the eye pupil 110 may be changed, to facilitate vergence-driven eye accommodation. The location may be changed due to a change of the optical power, or the focal length, of the lens 100C. The location of the image plane may also be changed without a change in the optical power as explained above. In either case, adjusting the location of the image plane relative to the eye pupil 110 provides a real-time eye accommodation variation for a viewer of the display panel 106. In the embodiment shown in FIG. 1C, the first reflector 111 is the partial (e.g. 50/50) reflector.

Figure 1D:
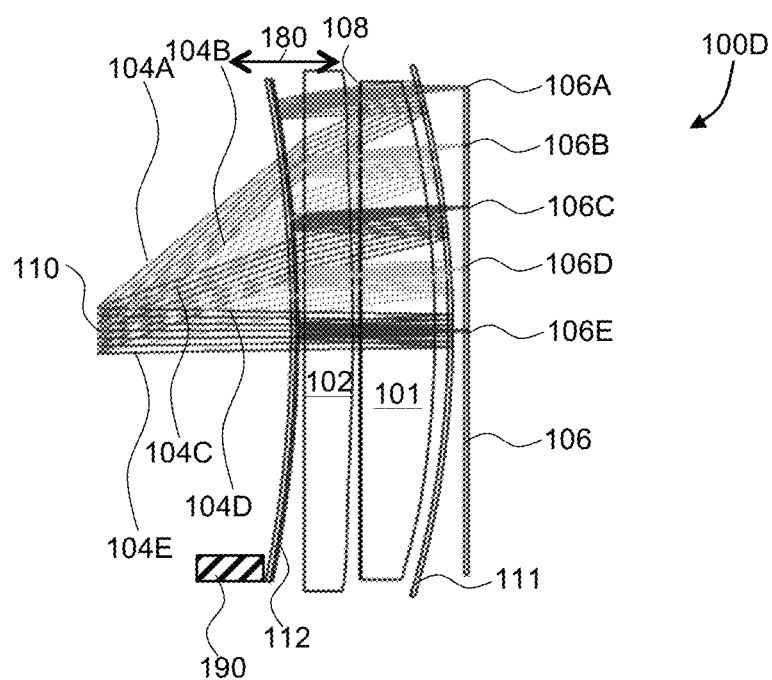
FIG. 1D is a ray-traced view of an embodiment of the tunable lens of FIG. 1A with a translatable reflective polarizer.

Turning to FIG. 1D with further reference to FIG. 1A, a tunable lens 100D (FIG. 1D) is an embodiment of the tunable lens 100A (FIG. 1A). In the tunable lens 100D of FIG. 1D, the second reflector 112, e,g, the curved reflective polarizer, is translatable. In some embodiments, the reflective polarizer may be flat. At least one of the first 111 or second 112 reflectors may be translatable for tuning the optical power of the tunable lens by application of an external signal. The first 111 and/or second 112 reflectors may be adhered to/supported by an additional substrate, and the additional substrate may be shifted to shift the first 111 and/or second 112 reflectors.

Figure 2:
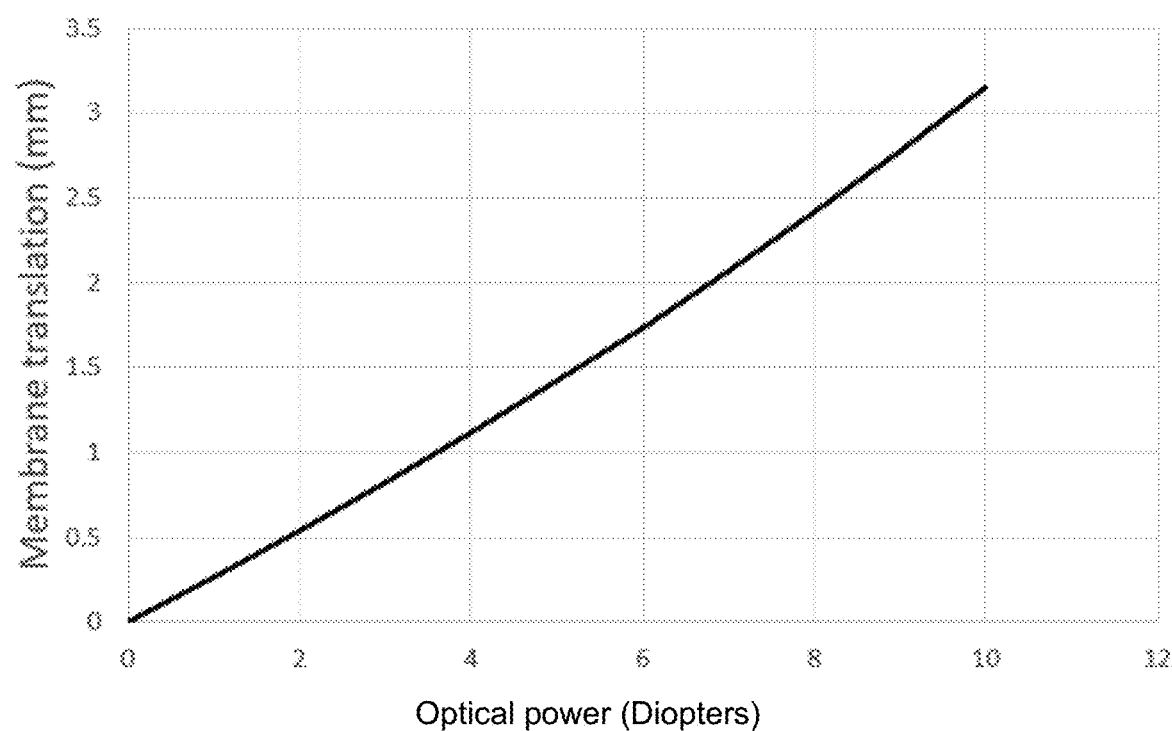
FIG. 2 is a graph of translation distance vs. the optical power variation of the tunable lens 100D of FIG. 1D.

Referring to FIG. 2, a reflector translation is plotted vs. the required optical power change (in Diopters) of the tunable lens 100C of FIG. 1C. One can see that to achieve a 10 Diopter change of the optical power, a translation of only about 3 mm is required. Since the reflector is disposed on a thin and light membrane, the translation of one or both reflectors may be performed in a quick and energy-efficient manner by translation stages 190 of FIGS. 1C and 1D. By way of non-limiting examples, the translation stages 190 may include an actuator such as, for example, a stepper motor, a voice coil actuator, a shape memory alloy, a DC motor, a piezo electric, and/or an electromagnetic actuator. The actuator is controllable by application of an external electric signal such as voltage, current, etc. Examples of translation configurations for the reflectors of the tunable lenses 100A, 100C, or 100D are diven in FIGS. 3A to 3D.

Figure 3A:
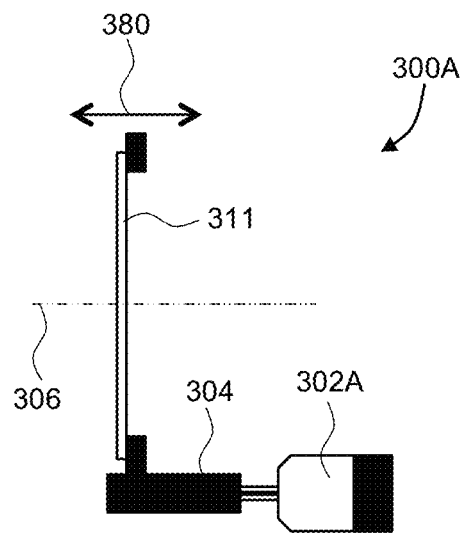
FIG. 3A is a schematic side view of a translatable reflector of the tunable lenses of FIGS. 1A to 1D on a motor-actuated translation stage.

Referring first to FIG. 3A, a translatable reflector assembly 300A may be used to translate the reflector 111 and/or 112 of the tunable lenses 100A, 100C, or 100D of FIGS. 1A, 1C, and 1D respectively. The translatable reflector assembly 300A of FIG. 3A includes a reflector 311 supported by a translation stage 304, which corresponds to the translation stage 190 of the tunable lenses 100C and 100D. The translation stage 304 is actuated by a miniature motor 302A to translate the reflector 311 along an optical axis 306 of the tunable lens as indicated by an arrow 380. The miniature motor 302A may include, for example, a stepper motor or a DC motor, e.g. a DC brushless servo motor. The motor 302A may be activated by an application of an electric signal causing the motor 302A to rotate by a controlled angle.

Figure 3B:
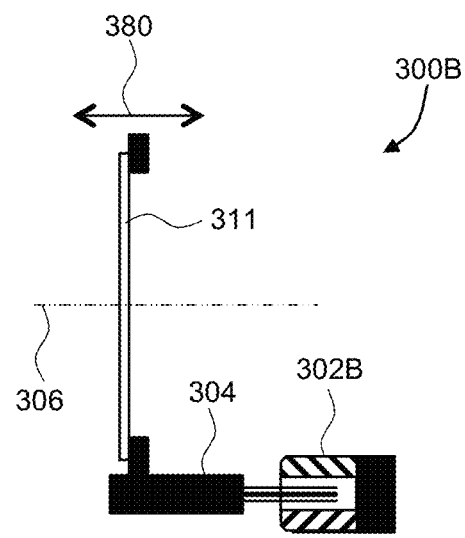
FIG. 3B is a schematic side view of a translatable reflector of the tunable lenses of FIGS. 1A to 1D having a miniature voice coil/electromagnetic actuator.

Referring to FIG. 3B, a translatable reflector assembly 300B may be used to translate the reflector 111 and/or 112 of the tunable lenses 100A, 100C, or 100D of FIGS. 1A, 1C, and 1D respectively. The translatable reflector assembly 300B of FIG. 3B includes a reflector 311 supported by the translation stage 304, which corresponds to the translation stage 190 of the tunable lenses 100C and 100D. The translation stage 304 is actuated by an electromagnetic actuator 302B to translate the reflector 311 along an optical axis 306 of the tunable lens as indicated by the arrow 380. The electromagnetic actuator 302B may include, for example, an electromagnetic coil coupled to a permanent magnet, and/or a voice coil. The electromagnetic actuator 302B may be actuated by application of external signal, e.g. current, to translate the reflector 311 by a controlled amount.

Figure 3C:
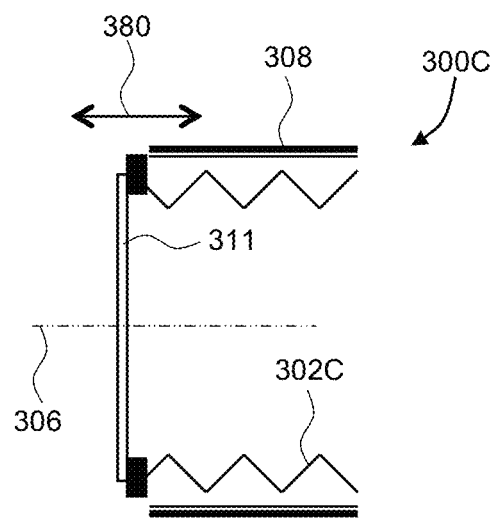
FIG. 3C is a schematic side view of a mounted reflector of the tunable lenses of FIGS. 1A to 1D movable by shape memory alloy actuators.

Referring now to FIG. 3C, a translatable reflector assembly 300C may be used to translate the reflector 111 and/or 112 of the tunable lenses 100A, 100C, or 100D of FIGS. 1A, 1C, and 1D respectively. The translatable reflector assembly 300C of FIG. 3C is an example of a translatable reflector that does not require a translation stage. The translatable reflector assembly 300C includes a reflector 311 supported by a plurality of memory alloy actuators 302C. The memory alloy actuators 302C may include a memory alloy wire that changes its shape depending on temperature. The temperature may be adjusted by a plurality of heaters 308 disposed in a thermal contact with the memory alloy actuators 302C. Application of electrical current to the heaters 308 cause the memory alloy actuators 302C to translate the reflector 311 by a controlled amount.

Figure 3D:
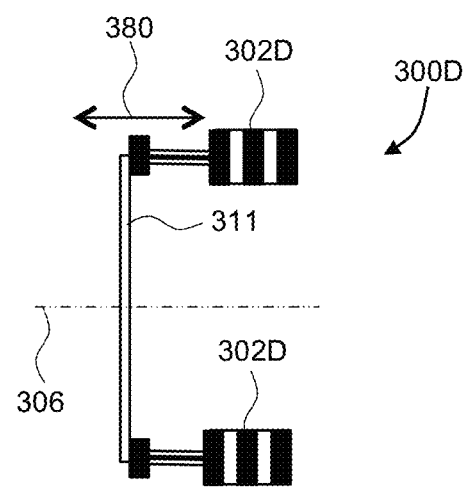
FIG. 3D is a schematic side view of a mounted reflector of the tunable lenses of FIGS. 1A to 1D movable by piezoelectric actuators.

Turning to FIG. 3D, a translatable reflector assembly 300D may be used to translate the reflector 111 and/or 112 of the tunable lenses 100A, 100C, or 100D of FIGS. 1A, 1C, and 1D respectively. The translatable reflector assembly 300D of FIG. 3D is another example of translatable reflector that does not require a translation stage. The translatable reflector assembly 300D includes a reflector 311 supported by a plurality of piezoelectric actuators 302D. The piezoelectric actuators 302D may include a stack of piezoelectric elements. A length of the stack of the piezoelectric elements may be varied by applying voltage to the stack, causing the piezoelectric actuators 302D to translate the reflector 311 by a controlled amount.

Figure 4:
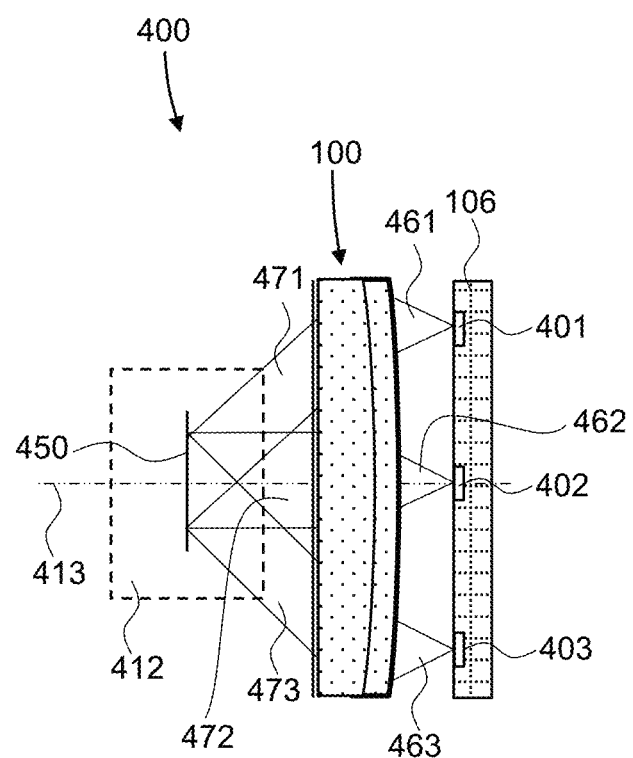
FIG. 4 is a schematic view of a near-eye display including the tunable lens of FIGS. 1A, 1C, and/or 1D used as an ocular lens of the near-eye display.

Referring to FIG. 4, a near-eye display (NED) 400 may include any of the tunable lenses disclosed herein. The NED 400 includes the display panel 106 coupled to a tunable lens 100, e.g. the lens 100A, 100C, and 100D of FIGS. 1A, 1C, and 1D respectively, or any variant of such lens considered herein. The display panel 106 is configured to provide an image in linear domain. Three such display panel pixels are shown in FIG. 4, a first pixel 401, a second pixel 402, and a third pixel 403. The second pixel 402 is an on-axis pixel, i.e. the second pixel 402 is disposed on the optical axis 413 of the lens 100, while the first 401 and third 403 pixels are off-axis pixels disposed away from the optical axis 413.

The lens 100 is configured to convert the image in linear domain into an image in angular domain at an eyebox 412 of the NED 400 for direct observation by a user's eye, not shown, at the eyebox 412. The term "image in angular domain" refers to an image where individual pixels of the image are represented by an angle of a collimated optical beam at the eyebox 412. For example, the first pixel 401 emits a first diverging cone of light 461 that is collimated by the lens 100 into a first collimated light beam 471 having an oblique angle of incidence at an image plane 450 of the NED 400, generally disposed in the eyebox 412. The second pixel 402 emits a second diverging cone of light 462 that is collimated by the lens 100 into a second collimated light beam 472 having a zero (or normal) angle of incidence at the image plane 450. Finally, the third pixel 403 emits a third diverging cone of light 463 that is collimated by the lens 100 into a third collimated light beam 473 having an oblique angle of incidence at the image plane 450, of an opposite sign as the first collimated light beam 471. In other words, the lens 100 operates as an offset-to-angle element converting an offset of a diverging beam of light upstream of the lens 100 into an angle of a collimated beam of light downstream of the lens 100.

In the NED 400, the display panel 106 is imaged by the lens 100 to the image plane 450. Accommodation of the eye, required for eye lens focusing, is a function of the distance from the eye to the image plane 450. The image plane 450 location is determined by the focal length and the relative position of the focal point of the lens 100 with respect to the display panel 106. The image plane 450 location may change when: the focal length changes; the focal point shifts with respect to the display panel 106; or both. For instance, if the entire lens 100 moves with respect to the display panel 106, the image plane 450 location changes as the focal point shifts with respect to the display panel 106, even though the focal length of the lens 100 is constant. This may be similar to axially translating a flat reflector within the lens 100, which may or may not change the focal length of the lens 100, depending on a specific configuration of the lens 100.

Figure 5:
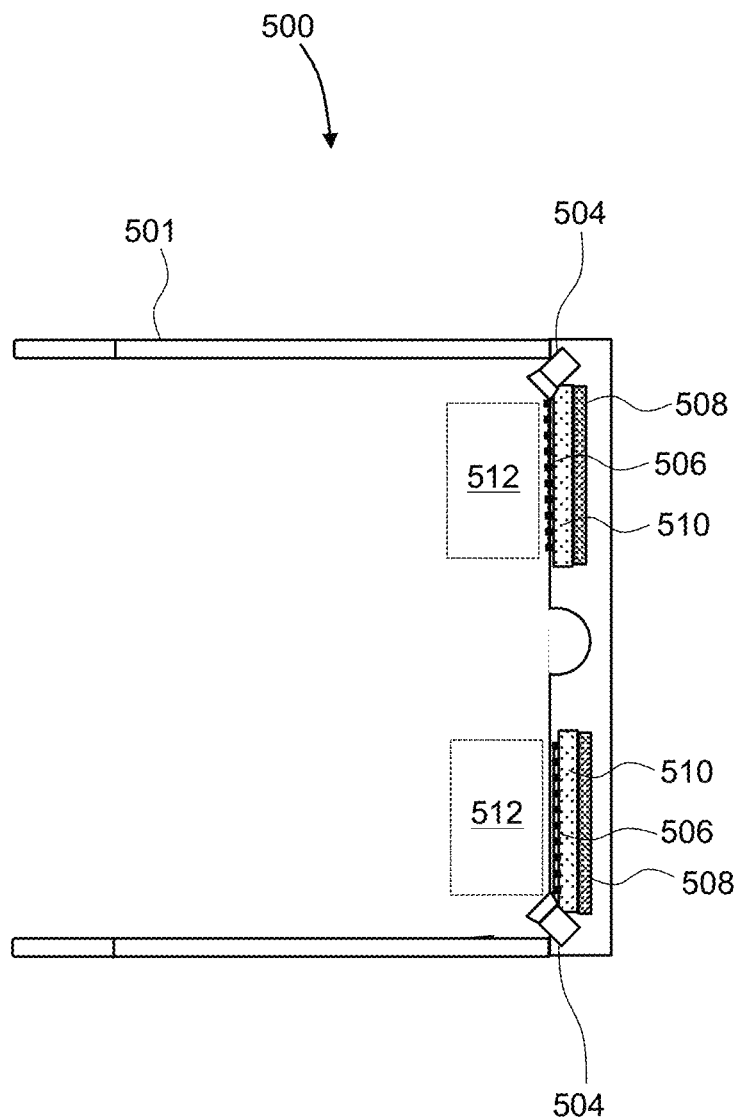
FIG. 5 is a top view of a near-eye display having a form factor of a pair of eyeglasses.

Referring to FIG. 5, a near-eye display 500 includes a frame 501 having a form factor of a pair of eyeglasses. The frame 501 supports, for each eye: an electronic display panel 508, an ocular lens 510 optically coupled to the electronic display panel 508, an eye-tracking camera 504, and a plurality of illuminators 506. The ocular lens 510 may include any of the tunable lenses disclosed herein. The illuminators 506 may be supported by the ocular lens 510 for illuminating an eyebox 512. The electronic display panel 508 provides an image in linear domain that is converted by the ocular lens 510 into an image in angular domain for observation by a user's eye.

The purpose of the eye-tracking cameras 504 is to determine position and/or orientation of both eyes of the user. Once the position and orientation of the user's eyes are known, a gaze convergence distance and direction may be determined. The imagery displayed by the display panels 508 may be adjusted dynamically to account for the user's gaze, for a better fidelity of immersion of the user into the displayed augmented reality scenery, and/or to provide specific functions of interaction with the augmented reality. The focal point/image plane location of the ocular lenses 510 may be tuned by translating reflectors of the ocular lenses 510 to lessen vergence-accommodation conflict, reducing tiredness and headache of a user of the near-eye display 500. In operation, the illuminators 506 illuminate the eyes at the corresponding eyeboxes 512, to enable the eye-tracking cameras 504 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 512.

Figure 6:
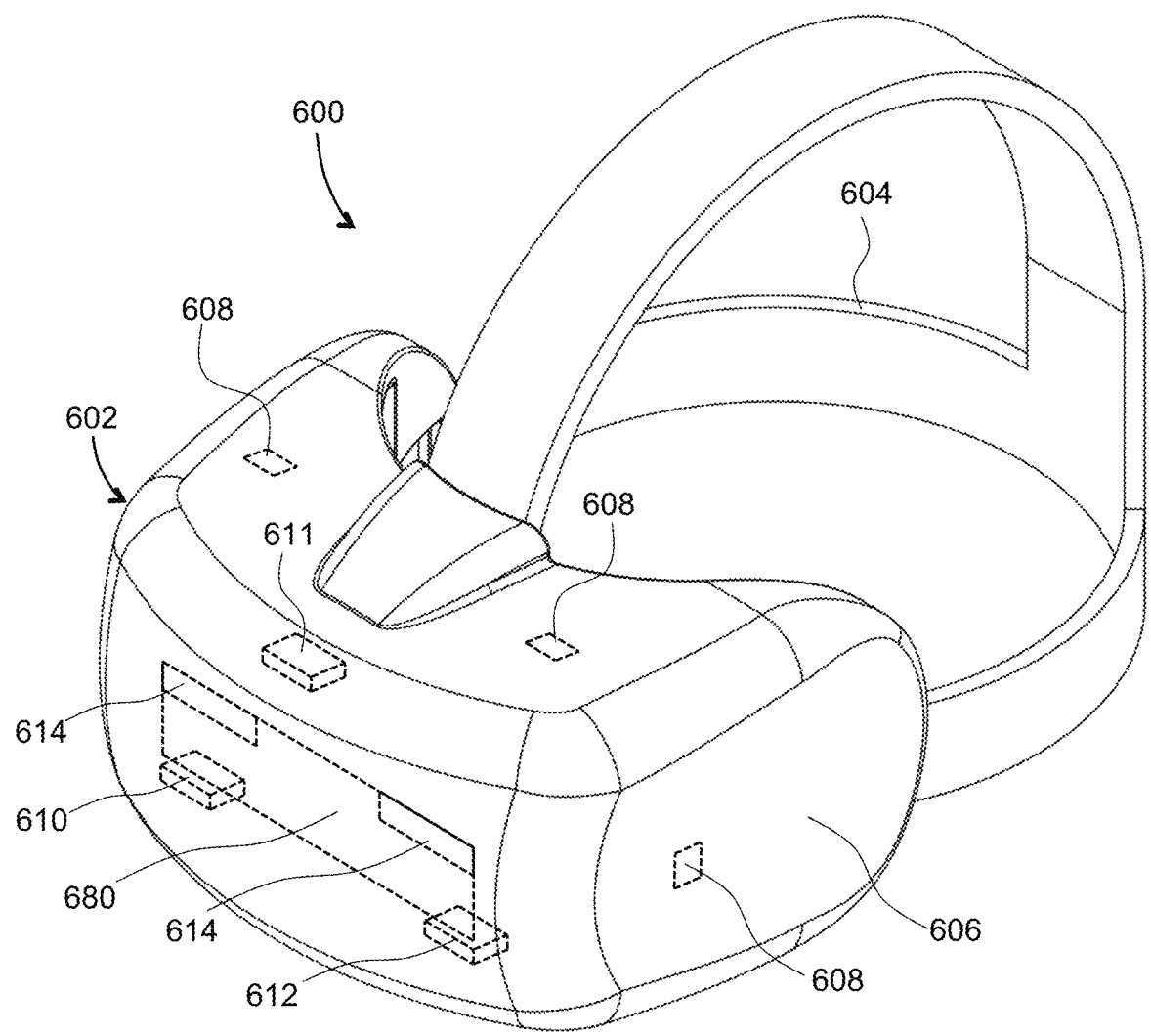
FIG. 6 is a three-dimensional view of a head-mounted display of this disclosure.

Turning to FIG. 6, an HMD 600 is an example of an AR/VR wearable display system which encloses the user's face, for a greater degree of immersion into the AR/VR environment. The function of the HMD 600 may be to generate the entirely virtual 3D imagery. The HMD 600 may include a front body 602 and a band 604. The front body 602 is configured for placement in front of eyes of a user in a reliable and comfortable manner, and the band 604 may be stretched to secure the front body 602 on the user's head. A display system 680 may be disposed in the front body 602 for presenting AR/VR imagery to the user. The display system 680 may include any of the tunable lenses disclosed herein. Sides 606 of the front body 602 may be opaque or transparent.

In some embodiments, the front body 602 includes locators 608 and an inertial measurement unit (IMU) 610 for tracking acceleration of the HMD 600, and position sensors 612 for tracking position of the HMD 600. The IMU 610 is an electronic device that generates data indicating a position of the HMD 600 based on measurement signals received from one or more of position sensors 612, which generate one or more measurement signals in response to motion of the HMD 600. Examples of position sensors 612 include: one or more accelerometers, one or more gyroscopes, one or more magnetometers, another suitable type of sensor that detects motion, a type of sensor used for error correction of the IMU 610, or some combination thereof. The position sensors 612 may be located external to the IMU 610, internal to the IMU 610, or some combination thereof.

The locators 608 are traced by an external imaging device of a virtual reality system, such that the virtual reality system can track the location and orientation of the entire HMD 600. Information generated by the IMU 610 and the position sensors 612 may be compared with the position and orientation obtained by tracking the locators 608, for improved tracking accuracy of position and orientation of the HMD 600. Accurate position and orientation is important for presenting appropriate virtual scenery to the user as the latter moves and turns in 3D space.

The HMD 600 may further include a depth camera assembly (DCA) 611, which captures data describing depth information of a local area surrounding some or all of the HMD 600. The depth information may be compared with the information from the IMU 610, for better accuracy of determination of position and orientation of the HMD 600 in 3D space.

The HMD 600 may further include an eye tracking system 614 for determining orientation and position of user's eyes in real time. The obtained position and orientation of the eyes also allows the HMD 600 to determine the gaze direction of the user and to adjust the image generated by the display system 680 accordingly. In one embodiment, the vergence, that is, the convergence angle of the user's eyes gaze, is determined. The determined gaze direction and vergence angle may be used to adjust focal length of lenses of the display system 680 to reduce the vergence-accommodation conflict. The direction and vergence may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 602.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A lens comprising:
opposed first and second reflectors;
wherein the first reflector is configured to at least partially transmit a light beam therethrough to impinge onto the second reflector, and wherein the second reflector is configured to at least partially reflect the light beam propagated through the first reflector back to the first reflector;
wherein the first reflector is further configured to at least partially reflect the light beam reflected by the second reflector back to the second reflector, and wherein the second reflector is further configured to at least partially transmit the light beam reflected by the first reflector; and
wherein at least one of the first or second reflectors is translatable in a direction parallel to an optical axis of the lens by application of a control signal for tuning at least one of a focal length of the lens or a location of a focal point of the lens.

2. The lens of claim 1, wherein the first reflector comprises a partially reflective mirror.

3. The lens of claim 2, wherein the partially reflective mirror is a 50/50 mirror.

4. The lens of claim 2, wherein the second reflector comprises a reflective polarizer, the lens further comprising a quarter-wave plate between the first and second reflectors for converting a polarization state of the light beam from a first polarization state to a second, orthogonal polarization state upon a double pass propagation of the light beam through the quarter-wave plate.

5. The lens of claim 4, wherein the reflective polarizer is a linear reflective polarizer.

6. The lens of claim 1, wherein the at least one of the first or second reflectors is coupled to an actuator controllable by application of an external electric signal, for tuning the at least one of a focal length of the lens or a location of a focal point of the lens.

7. The lens of claim 6, wherein the actuator comprises at least one of: a stepper motor, a voice coil actuator, a shape memory alloy, a DC motor, a piezo electric, or an electromagnetic actuator.

8. The lens of claim 6, wherein the at least one of the first or second reflectors is mounted on a translation stage movable by the actuator.

9. The lens of claim 1, wherein at least one of the first or second reflectors is deformable by application of a control signal for tuning the at least one of a focal length of the lens or a location of a focal point of the lens.

10. The lens of claim 1, further comprising a first refractive lens element between the first and second reflectors.

11. The lens of claim 10, further comprising a second refractive lens element between the first and second reflectors serially coupled to the first refractive lens element.

12. A near-eye display (NED) comprising:
a display panel for providing image light carrying an image; and
a tunable ocular lens for viewing the image therethrough, the tunable ocular lens comprising:
opposed first and second reflectors, wherein the first reflector is configured to at least partially transmit the image light therethrough to impinge onto the second reflector, and wherein the second reflector is configured to at least partially reflect the image light back to the first reflector;
wherein the first reflector is further configured to at least partially reflect the image light back to the second reflector, and wherein the second reflector is further configured to at least partially transmit the image light therethrough for viewing the image; and
wherein at least one of the first or second reflectors is translatable in a direction parallel to an optical axis of the lens by application of a control signal for tuning a location of an image plane of the tunable ocular lens.

13. The NED of claim 12, wherein the at least one of the first or second reflectors is coupled to an actuator controllable by application of an external electric signal, for tuning the image plane location.

14. The NED of claim 13, wherein the actuator comprises at least one of: a stepper motor, a voice coil actuator, a shape memory alloy, a DC motor, a piezoelectric, or an electromagnetic actuator.

15. NED of claim 14, wherein the at least one of the first or second reflectors is mounted on a translation stage movable by the actuator.

16. The NED of claim 12, further comprising a refractive lens element between the first and second reflectors.

17. A pancake lens comprising:
a partial reflector;
a linear reflective polarizer; and
a quarter-wave plate in an optical path between the partial reflector and a linear reflective polarizer;
wherein at least one of the partial reflector or linear reflective polarizer is curved; and
wherein at least one of the partial reflector or linear reflective polarizer translatable in a direction parallel to an optical axis of the lens by application of a control signal for at least one of a focal length of the pancake lens or a location of a focal point of the pancake lens.

18. The pancake lens of claim 17, wherein the at least one of the partial reflector or the linear reflective polarizer is coupled to an actuator controllable by application of an external electric signal, for tuning the at least one of a focal length or a location of a focal point of the pancake lens.

19. The pancake lens of claim 18, wherein the actuator comprises at least one of: a stepper motor, a voice coil actuator, a shape memory alloy, a DC motor, a piezo electric, or an electromagnetic actuator.

20. The pancake lens of claim 19, wherein the at least one of the partial reflector or the linear reflective polarizer is mounted on a translation stage movable by the actuator.

* * * * *